United States Patent [19]

Moewe et al.

[11] 4,154,543
[45] May 15, 1979

[54] APPARATUS FOR DISASSEMBLY OF A TAPERED CONNECTION USING FLUID PRESSURE

[75] Inventors: Clinton F. Moewe, Pekin; Alfred C. LaGrow, Peoria, both of Ill.

[73] Assignee: Caterpillar Tractor Co., Peoria, Ill.

[21] Appl. No.: 901,040

[22] Filed: Apr. 28, 1978

[51] Int. Cl.² ............................................. F16B 1/06
[52] U.S. Cl. ....................................... 403/15; 403/34
[58] Field of Search ................ 403/15, 16, 40, 39, 403/38, 34, 35, 36, 37; 29/427, 252

[56] References Cited

U.S. PATENT DOCUMENTS

| 2,084,439 | 6/1937 | Hamer ................................ 403/15 |
| 2,744,310 | 5/1956 | Gould ................................ 29/252 X |
| 3,228,102 | 1/1966 | Sillett ............................... 29/427 X |
| 3,267,568 | 8/1966 | Johnson et al. ................... 29/252 X |
| 3,898,010 | 8/1975 | Jungbluth et al. ................ 403/15 |

Primary Examiner—Andrew V. Kundrat
Attorney, Agent, or Firm—John L. James

[57] ABSTRACT

Apparatus is provided for disassembly of a tapered connection (20) by injecting fluid into a threaded bolt hole (24) and pressurizing the fluid by tightening the bolt (34). The pressurized fluid between the members (12, 14) forming the connection (20) forces the members (12, 14) to separate. The apparatus purges compressible air from the connection (20) thereby allowing the pressure to build and separate the members (12, 14).

8 Claims, 3 Drawing Figures

4,154,543

APPARATUS FOR DISASSEMBLY OF A TAPERED CONNECTION USING FLUID PRESSURE

TECHNICAL FIELD

Apparatus is provided for disassembly of a tapered connection by injecting fluid into a threaded bolt hole and annular groove and pressurizing the fluid by tightening the bolt. The pressurized fluid between the members forming the connecting forces the members to separate.

BACKGROUND ART

Tapered connections are commonly used for connecting machine parts, such as for connecting a gear to a shaft for example. The gear is forced onto the shaft and it is often difficult to separate the gear and shaft once they are assembled. A recent attempt to separate the tapered members is described in U.S. Pat. No. 3,989,010 which issued to Leroy F. Jungbluth and James B. Black on Aug. 5, 1975.

Jungbluth and Black used a plurality of bolts threadably connected to the shaft. Only one of the plurality of bolts is connected to the annulus existing between the members. By removing the one bolt and injecting hydraulic oil or grease, they were able to reinsert the bolt thereby pressurizing the fluid to force the members to separate. Teflon tape was wrapped around the bolt threads to prevent the escape of air or fluid during the tightening of the bolt.

While the use of Teflon tape is acceptable in some applications, the fluid pressure developed therewith is limited and not suitable for all applications. For some tapered connections, fluid pressures in excess of 44,096 kPa are required to separate the members. With Teflon tape, it is difficult to turn the pressurizing bolt fast enough to overcome air or fluid leakage past the Teflon tape to build fluid pressure up to 44,096 kPa. This method entraps both air and fluid. Since air is compressible, the pressure is limited. It is desirable to have an apparatus which purges compressible air and develops pressures in excess of 44,096 kPa for separating the members of a tapered joint.

DISCLOSURE OF THE INVENTION

In one aspect of the present invention, an assembly has inner and outer members connected together by a tapered connection and defines an annulus therebetween. The inner member has a plurality of chambers which open on the inner member and are connected to the annulus. In another aspect of the present invention, a tapered connection comprises a shaft which has a plurality of chambers and a gear which is connected to the shaft and defines an annulus therebetween. The annulus is connected to the plurality of chambers.

The members which are joined together by the tapered connection are very difficult to separate. By injecting fluid into one of the chambers and tightening a bolt, the fluid is pressurized; however, air trapped in the chamber and annulus is compressed limiting the pressure obtainable. By connecting the annulus to more than one chamber, the air is free to escape and does not limit the pressure obtainable.

BEST MODE FOR CARRYING OUT THE INVENTION

Figure 1:
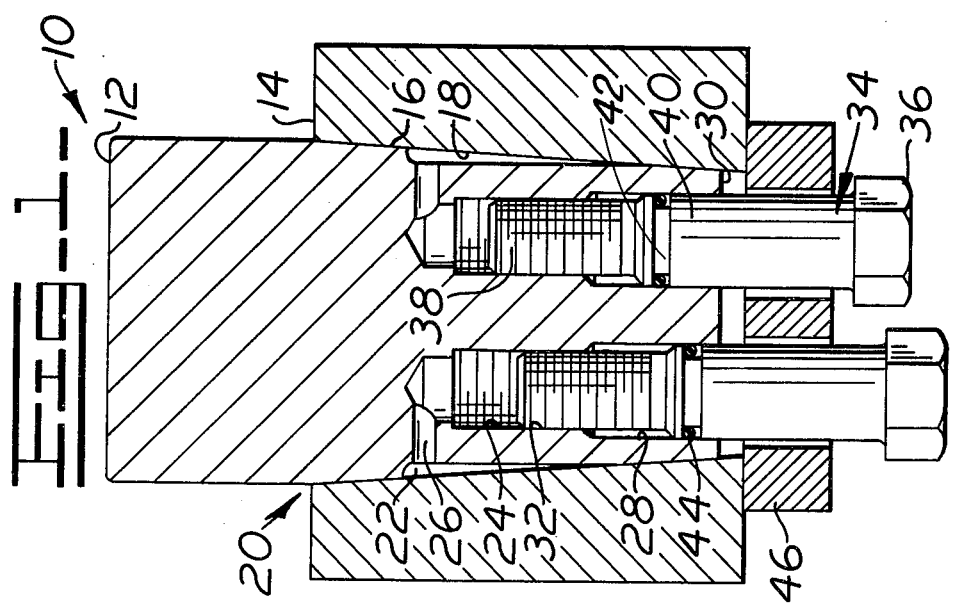
FIG. 1 is a diagrammatic longitudinal cross-sectional view of an embodiment of the present invention.

Referring to FIG. 1, an assembly 10, such as fan or gear assembly for example, has a first member 12 and a second member 14 which fits onto the first member 12. The first member 12 has a tapered outside surface 16 and the second member 14 has a tapered inside surface 18. The second member 14 is forced onto the first member 12 so that the surfaces 16,18 contact each other forming a tapered connection or joint 20.

An annulus 22 is formed between the tapered surfaces 16,18 in assembled joint 20.

A plurality of bolt holes 24 are provided in the first member 12. Each bolt 24 extends into the first member 12 and is connected to the annulus 22 by a passageway 26. By this construction fluid entering through the bolt holes 24 is urged through the passageway 26 to the annulus 22. The bolt hole 24 and passageway 26 serve as a chamber for receiving fluid and dispersing the fluid to the annulus 22.

Each bolt hole 24 has a first portion 28 of a preselected diameter opening on an end surface 30 of the first member 12 and a second threaded portion 32 of a preselected diameter which is less than the diameter of the first portion 28. The second portion 32 is connected to the annulus 22 by the passageway 26.

Each bolt hole 24 receives a bolt 34 which has first and second end portions 36,38 and a middle portion 40 positioned between the end portions 36,38. The first end portion 36 is constructed for receiving a wrench to install or remove the bolt 34. The second end portion 38 is threadably mateable with the second portion 32 of the bolt hole 24. The second end portion 38 of the bolt 34 has a smaller diameter than the first end portion 36 of the bolt 34.

The middle portion 40 of the bolt 34 defines an annular groove 42 which receives an O-ring 44 for preventing the escape of fluid from the bolt hole 24 in the installed position.

The middle portion 40 is tapered between the groove 42 and first end portion 36. The middle portion 40 tapers so that the bolt 34 follows the contour of the bolt hole 24 where the diameter of the hole 24 changes from the diameter of the first portion 28 of the hole 24 to the diameter of the second portion 32 of the hole 24. By this construction, spaces through which fluid may inadvertently escape are minimized.

A cap member 46 is positioned over the ends of the first and second members 12,14 and attached thereto by the bolts 34.

Figure 2:
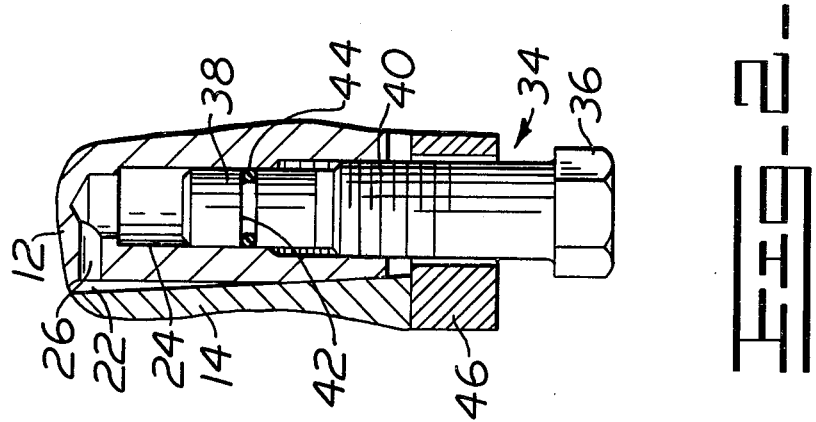
FIG. 2 is a partial sectional view similar to FIG. 1 but showing another embodiment.

Referring to FIG. 2, the middle portion of the bolt 34 is threaded and mateable with the first portion 28 of the bolt hole 24 which is also threaded and the second end 38 of the bolt contains annular groove 42.

Figure 3:
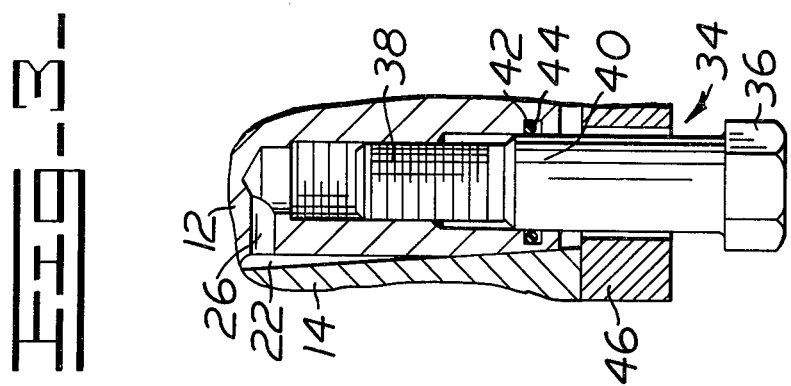
FIG. 3 is a partial sectional view similar to FIGS. 1 and 2 but showing another embodiment.

Referring to FIG. 3, the annular groove 42 is formed in the bolt hole 24 instead of the bolt 34.

INDUSTRIAL APPLICABILITY

In one aspect of the invention, a gear assembly 10 has a gear 14 connected to a shaft 12 forming a tapered joint 20. When it is desired to remove the gear 14 from the shaft 12 all of the bolts 34 are backed out of the opening a preselected distance adequate to break the seal. One of the bolts 34 is removed. Fluid or grease is then injected into the bolt hole 24 forcing trapped air out of the bolt holes 24, passageways 26 and annulus 22. The removed bolt 34 is then reinserted into its hole 24 and the other bolts 34 are tightened until each O-ring 44 sealingly engages each hole 24.

As the removed bolt 34 is tightened by a wrench or other means, the O-ring prevents the fluid from escaping through the bolt hole 24. Since the fluid cannot escape, the fluid becomes pressurized as the bolt 34 is tightened. Fluid pressure acts on the surfaces defining the annular groove 22 and forces the shaft 12 and gear 14 to separate.

The cap member 46 limits the travel of the gear 14 relative to the shaft 12 during separation thereby preventing the gear 14 from suddenly leaving the shaft 12.

In another aspect of the invention, a fan assembly 10 has a fan blade hub 12 connected to a shaft 12 forming a tapered joint 20. The joint 20 is disassembled in the same manner as the gear assembly joint.

Other aspects, objects and advantages of this invention can be obtained from a study of the drawings, the disclosure and the appended claims.

What is claimed is:

1. In an assembly (10) having inner (12) and outer (14) members connected together by a tapered connection (20) and defining an annulus (22) therebetween, said inner member (12) having at least two axial chambers (24) the improvement comprising:
    each of said chambers (24) having a first portion (28) of a preselected diameter opening on the inner member (12) and a second portion (32) of a preselected diameter less than the diameter of the first portion (28) and being connected to the annulus (22).

2. An assembly (10), as set forth in claim 1, wherein the first portion of each of the chambers defines an annular groove.

3. An assembly (10), as set forth in claim 2, including an O-ring positioned in the annular groove.

4. An assembly (10), as set forth in claim 1, wherein one of the first and second portions (28,32) of each of said chambers (24) is threaded and including a bolt (34) threadably mateable with the chamber (24).

5. An assembly (10), as set forth in claim 4, wherein one of the chamber (24) and bolt (34) defines an annular groove (42) and including an O-ring positioned in the groove (42).

6. In an assembly (10) having a plurality of bolts (34) and inner (12) and outer (14) members connected together by a tapered connection and defining an annulus (22) therebetween, said inner member (12) having at least two axial chambers (24) each being threaded, said bolts (34) each being positioned in and threadably mateable with a respective one of the chambers (24), the improvement comprising:
    each of said chambers (24) having a first portion of a preselected diameter opening on the inner member (12) and a second portion (32) of a preselected diameter less than the diameter of the first portion (28) and being connected to the annulus (22).

7. An assembly (10), as set forth in claim 6, wherein each of the bolts (34) has a middle portion (40) defining an annular groove (42) and including a plurality of O-rings each positioned in a respective one of said annular grooves (42).

8. An assembly (10), as set forth in claim 6, wherein the first portion (28) of each of the chambers (24) defines an annular groove (42) and including a plurality of O-rings (44) each positioned in a respective one of said annular grooves (42).

* * * * *